(12) United States Patent
Hillmer

(10) Patent No.: US 7,346,927 B2
(45) Date of Patent: Mar. 18, 2008

(54) SYSTEM AND METHOD FOR STORING AND ACCESSING SECURE DATA

(75) Inventor: James M. Hillmer, Grand Rapids, MI (US)

(73) Assignee: Access Business Group International LLC, Ada, MI (US)

( * ) Notice: Subject to any disclaimer, the term of this patent is extended or adjusted under 35 U.S.C. 154(b) by 816 days.

(21) Appl. No.: 10/734,877

(22) Filed: Dec. 12, 2003

(65) Prior Publication Data

US 2004/0153650 A1 Aug. 5, 2004

Related U.S. Application Data

(60) Provisional application No. 60/432,835, filed on Dec. 12, 2002.

(51) Int. Cl.
*G06F 11/00* (2006.01)
*H04L 9/00* (2006.01)

(52) U.S. Cl. .................... 726/22; 726/23; 713/181

(58) Field of Classification Search ............... 713/176, 713/181, 186, 193; 726/2–4, 22–23, 26; 705/50, 64, 67, 75
See application file for complete search history.

(56) References Cited

U.S. PATENT DOCUMENTS

| 5,933,498 A | 8/1999 | Schneck et al. ............ 380/4 |
| 5,991,751 A | 11/1999 | Rivette et al. ............ 707/1 |
| 5,991,758 A | 11/1999 | Ellard ...................... 707/6 |
| 6,272,495 B1 | 8/2001 | Hetherington ........... 707/101 |
| 6,317,834 B1 | 11/2001 | Gennaro et al. ......... 713/186 |
| 6,446,210 B1 | 9/2002 | Borza .................... 713/201 |
| 6,678,826 B1 | 1/2004 | Kelly et al. ............. 713/201 |
| 7,024,562 B1 * | 4/2006 | Flink et al. ............. 713/186 |
| 2001/0037454 A1 | 11/2001 | Botti et al. ............. 713/176 |
| 2003/0154194 A1 | 8/2003 | Jonas ........................ 707/3 |
| 2004/0039912 A1 | 2/2004 | Borrowman et al. ..... 713/176 |
| 2004/0049521 A1 | 3/2004 | Borrowman ............ 707/104.1 |
| 2004/0210763 A1 | 10/2004 | Jonas |

FOREIGN PATENT DOCUMENTS

| WO | WO 00/51286 | 8/2000 |
| WO | WO 01/86486 A2 | 11/2001 |
| WO | WO 01/93586 A2 | 12/2001 |

(Continued)

OTHER PUBLICATIONS

PCT International Search Report PCT/US03/39571.

(Continued)

*Primary Examiner*—Hosuk Song
(74) *Attorney, Agent, or Firm*—Brinks Hofer Gilson & Lione

(57) ABSTRACT

The disclosed embodiments relate to a system and method for storing and accessing secure data where non-secure data needs to be exchanged between entities without exposing underlying or related secure data which is already known to those entities and which must also be communicated to identify or otherwise contextualize the non-secure data. A Hashing Facility is provided that uses a Hash Function to create a unique Hash Value from a secure data value. The Hash Value may then be communicated along with the related non-secure data.

48 Claims, 7 Drawing Sheets

FOREIGN PATENT DOCUMENTS

| WO | WO 02/03290 A1 | 1/2002 |
| WO | WO 02/05185 A1 | 2/2002 |
| WO | WO 03/009520 A1 | 1/2003 |
| WO | WO 03/021476 A1 | 3/2003 |
| WO | WO 03/058427 A1 | 7/2003 |
| WO | 2004/045123 A1 | 5/2004 |

OTHER PUBLICATIONS

Baker, Kuilwijk, Chang & Mah, Steptoe & Johnson LLP: Anonymization, Data-Matching and Privacy: A Case Study, Dec. 2003, pp. 1-12.

Kulish and Davis The Wall Street Journal online: "Bush Administration Defends Plan to Track Personal Data" article, obtained at http://online.wsj.com/article/P., SB103783072232689 . . . ction=wsjie/30day&vql_string-SRD<in>(article-body)(1 off 3), Nov. 22, 2002.

Anthes, Computerworld: "The Search Is On", article dated Apr. 1, 2002, obtained at http://www.computerworld.com/printhis/2002/0,4814,70041,00.html, Nov. 3, 2003 pp. 1-6.

Mollman, Wired News: "Betting on Private Data Search", article dated Mar. 5, 2003, story of location: http://www.wired.com/news/technology/0,1282,57903,00.html, obtained at http://www.wired.com/news/print/0,1294,57903,00.html, Nov. 3, 2003, pp. 1-4.

Jonas, SRD "TAPAC Testimony" Sep. 29, 2003, 27 pages, SRD Copyright© 2003.

SearchSecurity.com "MD5 Information Security Decisions, New York city, Apr. 19-21" obtained at http://searchsecurity.techtarget.com/sDefiniation/0,,sid14_gci527453,00.html, Feb. 27, 2004, pp. 1-3.

Whatis.com, "Hashing", obtained at http://whatis.techtarget.com/definition/0,289893,sid9_gci212230,00.html, Feb. 27, 2004, pp. 1-4.

Clark, The Wall Street Journal online article, Mar. 11, 2004, "Entrepreneur Offers Solution For Security-Privacy Clash" obtained at http://online.wsj.com/article_print/0,,SB107895921693251839,00.html, Mar. 16, 2004, pp. 1-3.

\* cited by examiner

SYSTEM AND METHOD FOR STORING AND ACCESSING SECURE DATA

REFERENCE TO RELATED APPLICATIONS

This application claims the benefit of the filing date under 35 U.S.C. § 119(e) of U.S. Provisional Application Ser. No. 60/432,835 filed Dec. 12, 2002, which is hereby incorporated by reference.

DETAILED DESCRIPTION OF THE DRAWINGS AND THE DISCLOSED EMBODIMENTS

Figure 1:
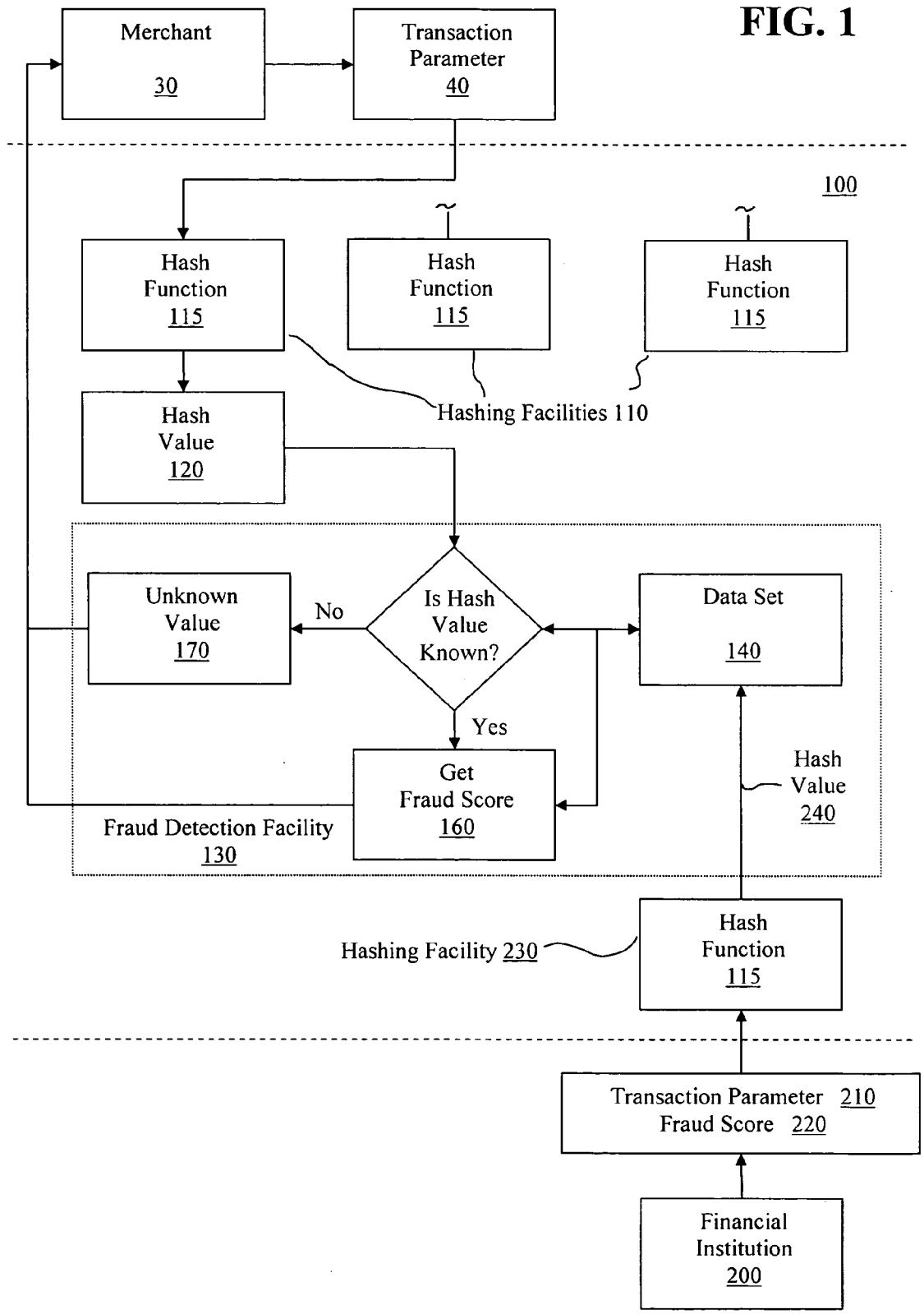
FIG. 1 is a block diagram of an exemplary commercial transaction system according to one embodiment.

The disclosed embodiments relate to a system and method for storing and accessing secure data. According to one embodiment, a system and method for storing and accessing information identifying past fraudulent transactions is disclosed. It will be appreciated that the disclosed embodiments are not limited to fraud related data and may be applicable to any type of information where the security of the data being accessed must be maintained. One disclosed system and method is comprised of a Hashing Facility that uses a Hash Function, described in more detail below, to create a unique Hash Value from a transaction parameter obtained from a customer by a merchant, bank, or other financial or lending institutions These transaction parameters may include one or more of the customers name, address, telephone number, social security number, bank account number, drivers license number, passport number, credit card number, store account number, tax identification number, business registration number, or any other parameter used to identify a customer. Other parameters may include an alternate shipping address to account for a customer who places an order for goods or services that are shipped to an alternate address, such as, for example, when a customer places an order with a merchant for a gift to be sent to a gift recipient. These transaction parameters may be merchant specific or generic to all merchants. Some transaction parameters are based on the nature of a merchant's requirements to process a given order. For example, a merchant which transacts in products which are not delivered (such as a service), may not collect a shipping address and therefore would not collect this particular transaction parameter. Further, e-commerce based merchants may have access to additional parameters such as Internet Protocol addresses, domain addresses or electronic mail addresses. The embodiments disclosed herein are designed to account for the different transaction parameters collected by or available from different merchant, bank, or other financial or lending institutions, and are capable of being configured to account for the availability or unavailability of transaction parameters in the determination of fraud. The above listing of transaction parameters is non-exhaustive and provided for illustrative purposes. Other suitable transaction parameters are known to those skilled in the art.

According to an alternative embodiment, a system and method for storing and accessing information identifying past criminal or suspicious activity is disclosed. The disclosed system and method is comprised of a Hashing Facility that uses a Hash Function, described in more detail below, to create a unique Hash Value from a parameter obtained from security, police, or government agencies. The parameter may include one or more of an entity's name, address, telephone number, social security number, bank account number, drivers license number, passport number, credit card number, store account number, tax identification number, business registration number, or any other parameter used to identify an entity. Other parameters may include an alternate shipping address to account for an entity that ho places an order for goods or services that are shipped to an alternate address, such as, for example, when an entity places an order with a merchant for a gift to be sent to a gift recipient. These parameters may be specific to each security, police, or government agency, or generic to all security, police, or government agencies. The embodiments disclosed herein are designed to account for the different parameters collected by or available from different security, police, or government agencies, and are capable of being configured to account for the availability or unavailability of parameters in the determination of a security risk or threat level posed by an entity. The above listing of parameters is non-exhaustive and provided for illustrative purposes. Other suitable parameters are known to those skilled in the art. or One disclosed system and method further utilizes a Fraud Detection Facility used to store known Hash Values for known parameters, and one or more Fraud Scores associated with those Hash Values. In an alternative embodiment, the disclosed system and method further utilize a Threat Detection Facility used to store known Hash Values for known parameters, and one or more Threat Scores associates with those Hash Values.

A Hash Function is a function that converts one string of characters into another, usually shorter, fixed-length string of characters, called a Hash Value. A strongly collision-free Hash Function is a Hash Function for which it is computationally infeasible that any two different character strings will return an identical Hash Value. A Hash Function is considered one-way if it is computationally infeasible to find a second Hash Function input that returns the same Hash Value as a first Hash Function input. "Hashing" is the process of applying a Hash Function to a string of characters to obtain a Hash Value. For more information on hashing and hashing functions, see http://whatis.techtarget.com/definition/0,289893,sid9_gci212230,00.html and/or http://searchsecurity.techtarget.com/sDefinition/0,sid14_gci527453, 00.html. As further described below, any function may be used with the disclosed embodiments which generates a substantially unique representation of a parameter value which substantially obscures that value from being observed and substantially prevents the value from being determined from the representation, i.e. reverse translated.

According to one disclosed embodiment, when a customer attempts to engage in a transaction with a merchant, one or more transaction parameters used to identify the customer, such as the customers name or social security number, is "hashed" using the hashing algorithm. This hashing algorithm essentially encrypts the transaction parameter, creating a unique alpha-numeric string, or Hash Value, which obscures the transaction parameter and from which the transaction parameter cannot be readily ascertained. This unique Hash Value is then transmitted by the merchant to the Fraud Detection Facility where it is compared against other known Hash Values. Since the parameter is hashed, or otherwise obscured, the transmission can occur via a secure or non-secure network, or even be communicated via telephone or facsimile. If a Hash Value is known to the Fraud Detection Facility, a Fraud Score associated with the Hash Value is returned to the merchant. The merchant can use this score to help determine whether or not to proceed with the sale to the customer. The hashed values and Fraud Scores may be provided to the Fraud Detection Facility by merchants, banks, and other financial institutions that have knowledge of fraudulent activities. For example, if a credit card is reported as being stolen, the issuing bank will send a Hash Value corresponding to that credit card number, along with the appropriate Fraud Score, to the Fraud Detection Facility. Subsequent queries to the Fraud Detection Facility on that credit card number will result in the Fraud Detection Facility issuing the Fraud Score associated with the hashed value representing that credit card.

According to one alternative embodiment, when an entity is being investigated for possible criminal or suspicious activities, one or more parameters used to identify the entity, such as the entity name or passport number, is "hashed" using the hashing algorithm. This hashing algorithm essentially encrypts the parameter, creating a unique alpha-numeric string, or Hash Value, which obscures the parameter and from which the parameter cannot be ascertained. This unique Hash Value is then transmitted by a security, police, or government agency to a Threat Detection Facility where it is compared against other known Hash Values. Since the parameter is hashed, or otherwise obscured, the transmission can occur via a secure or non-secure network, or even be communicated via telephone or facsimile. If a Hash Value is known to the Threat Detection Facility, a Threat Score, as described in more detail below, associated with the Hash Value is returned to the security, police, or government agency. The security or government agency can use this score to help determine whether or not to proceed with further investigation of the entity, or to otherwise alter the current investigation of the entity. The hashed values and Threat Scores may be provided to the Threat Detection Facility by security, police, or other government agencies that have knowledge of criminal or suspicious activities.

According to one embodiment of the disclosed system and method, the Fraud Detection Facility has access only to Hash Values. The Fraud Detection Facility does not have access to the information encrypted within the hashed values. For example, the Fraud Detection Facility may contain a hashed credit card number with an associated high Fraud Score but, due to the one-way, strongly collision-free nature of the hashing function, the Fraud Detection Facility does not have the ability to positively identify the actual credit card number. This feature allows merchants, banks, and other financial institutions to share information regarding fraud activity with the Fraud Detection Facility without concern that proprietary information, such as customer lists or losses due to fraud, will be shared with competitors, other business or agencies, or the general public.

According to an alternative embodiment of the disclosed system and method, the Threat Detection Facility has access only to Hash Values. The Threat Detection Facility does not have access to the information encrypted within the hashed values. For example, the Threat Detection Facility may contain a hashed individual or organization name with an associated high Threat Score but, due to the one-way, strongly collision-free nature of the hashing function, the Threat Detection Facility does not have the ability to positively identify the actual individual or organization name. This feature allows security, police, or governmental agencies to share information regarding criminal or suspicious activity with the Threat Detection Facility without concern that secure information, such as suspect identification, will be improperly accessed.

In one embodiment, a Fraud Detection Facility is included for storing the Hash Values that are obtained by applying a Hash Function to transaction parameters, along with a Fraud Score associated with each Hash Value. These parameters could include any one or more of the following: customer name, address, social security number, credit card number, bank account number, tax I.D. number, or any other of a number of identifiers known in the art. One skilled in the art will recognize that the Fraud Detection Facility may be comprised of one or more facilities, each sharing the hashed parameters and the associated Fraud Scores. The disclosed embodiments further include of one or more facilities for applying a Hash Function to a transaction parameter, or collection of transaction parameters. In one embodiment, a hash function/facility is provided as part of each merchant's or other participating entity's internal transaction processing systems which have access to the underlying transaction parameters. This ensures that any parameters are encoded, as described herein, prior to being transmitted outside of the entity, thereby preventing external entities from having access to the underlying parameter values, as described. Alternatively, the hash function/facility may be provided by a third party coupled with the merchant or other entity, such via a secure network connection. It will be appreciated that the disclosed embodiments attempt to minimize the unsecured exposure of the underlying transaction parameter values.

For purposes of disclosure, one embodiment will be described in connection with the purchase of goods from a merchant by a consumer. Furthermore, for purposes of disclosure, this purchase will be attempted using a credit card issued by a bank. Although described in connection with this particular application, the disclosed embodiments are well-suited for use in detecting fraud in other applications, such purchases using bank drafts or checks; purchases initiated over a network, such as the internet; transfers of funds between financial institutions or between governments; placement of a deposit on an item or items using a credit card; or any other financial transaction known in the arts. The disclosed system and method could also be used by online auction services, such as eBay, uBid, Bidplay, or other such services, to help reduce the fraudulent activities. In addition, the disclosed embodiments could be used to provide a system and method used to authenticate owners of software, hardware, digital audio or video files, or other digital data files or equipment used to access digital files, such as MP3 or DVD players. It will be appreciated that the disclosed system and method have application in any situation where non-secure data needs to be exchanged between entities without exposing underlying or related secure data which is already known to those entities and which must also be communicated to identify or otherwise contextualize the non-secure data.

With reference to FIG. 1, one embodiment of an exemplary commercial transaction system is shown at 100. The system 100 is comprised of a Hashing Facilities 110 coupled with a Fraud Detection Facility 130. Herein, the phrase "coupled with" is defined to mean directly connected to or indirectly connected through one or more intermediate components. Such intermediate components may include both hardware and software based components. A customer (NOT SHOWN) attempts to complete the purchase a product or products from a Merchant 30. The Merchant 30 provides the Hashing Facility 110 with a Transaction Parameter 40. The Hashing Facility 110 may be physically located at the point-of-sale, or it may be located remotely, such as at the merchant's 30 transaction processing system, and accessed using a telephone line, a network such as the internet or a WAN or LAN, or any other electronic communication system known in the art. The Hashing Facility 110, encrypts the Transaction Parameter 40 using a Hash Function 115. One skilled in the art will recognize that Hash Function 115 may be any one-way collision-free hashing function, such as MD-4 or MD-5, or other similar suitable encryption algorithm. The Hash Value 120 generated by the Hash Function 115 is then transmitted to the Fraud Detection Facility 130. As discussed above, the Hash Function 115 is both one-way and collision-free. In other words, no other Hash Value generated by any of the one or more Hashing Facilities 130 will be identical to Hash Value 120, unless those other Hash Values were also generated using the identical Hash Function 115 and Transaction Parameter 40.

The Hash Value 120 received by the Fraud Detection Facility 130 is compared with a Data Set of known Hash Values 140. If the Fraud Detection Facility has no record of Hash Value 120, then Fraud Detection Facility 130 returns a "Unknown Value" message 170, or any other similar message, to Merchant 30. If the Fraud Detection Facility 130 has a record of Hash Value 120, then Fraud Detection Facility 130 retrieves any Fraud Scores 160 associated with Hash Value 120. These Fraud Scores may include a range of values indicating the likelihood of fraudulent activity associated with the Hash Value 120. For example, if the Hash Value 120 is associated with a relatively large number of fraudulent activities, Fraud Score 160 may be correspondingly high. Similarly, if the Hash Value 120 is associated with only a few or no fraudulent activities, the Fraud Score 160 may be correspondingly low. In another embodiment, the Fraud Score 160 may be only one of two possible values; one value indicating that the customer's purchase is likely to be fraudulent, the other value indicating that the customer's purchase is not likely fraudulent. The Fraud Score 160 is then transmitted to the Merchant 30. Based upon the Fraud Score 160, and any other information deemed relevant by Merchant 30, such as the customer's past purchase or credit history, Merchant 30 may then elect to proceed with, or cancel the pending sale to the customer 10.

Data used to populate the Data Set 140 used by the Fraud Detection Facility 130 is provided by banks, merchants, and other financial institutions 200 or any other participating entity having knowledge of fraudulent activity. In one embodiment, Financial Institution 200 provides Transaction Parameter 210 and Fraud Score 220 to Hashing Facility 230. Hashing Facility 230 may be located within the financial institution 200, or they may be remotely located and accessed using a telephone line, a network such as the internet, LAN, or WAN, or any other electronic communication system known in the art. Hashing Facility 230 applies Hash Function 115 to the Transaction Parameter 210, and transmits the resulting Hash Value 240 and associated Fraud Score 220 to Fraud Detection Facility 130, where the information is stored in Data Set 140.

In one example of the illustrated embodiment, a financial institution 200 receives notification that a particular individual or other entity has engaged in fraudulent activities. The financial institution 200 provides the name, address, social security number, or any other appropriate identification parameter used to identify that particular individual or entity, along with a Fraud Score 220 to Hashing Facility 230. Hashing Facility 230 applies Hash Function 115 to each identification parameter of the individual or entity. Each resultant Hash Value 240, along with Fraud Score 220, is transmitted to the Fraud Detection Facility 130 and stored in Data Set 140. If that individual or entity attempts to purchase a product or service from Merchant 30, Merchant 30 may transmit a parameter identifying the individual or entity, Transaction Parameter 40, to Hashing Facility 110. Hashing Facility 110 applies Hash Function 115 to the Transaction Parameter 40 of the individual or entity, and the resultant Hash Value 120 is transmitted to Fraud Detection Facility 130. Fraud Detection Facility 130 compares Hash Value 120 with known hash values in Data Set 140. In the illustrated embodiment, Hash Value 120 is identical to at least one Hash Value 240 provided by Financial Institution 200. Fraud Score 220 is then transmitted to Merchant 30, thereby notifying Merchant 30 that the individual or entity may be attempting to engage in a fraudulent activity.

Figure 2:
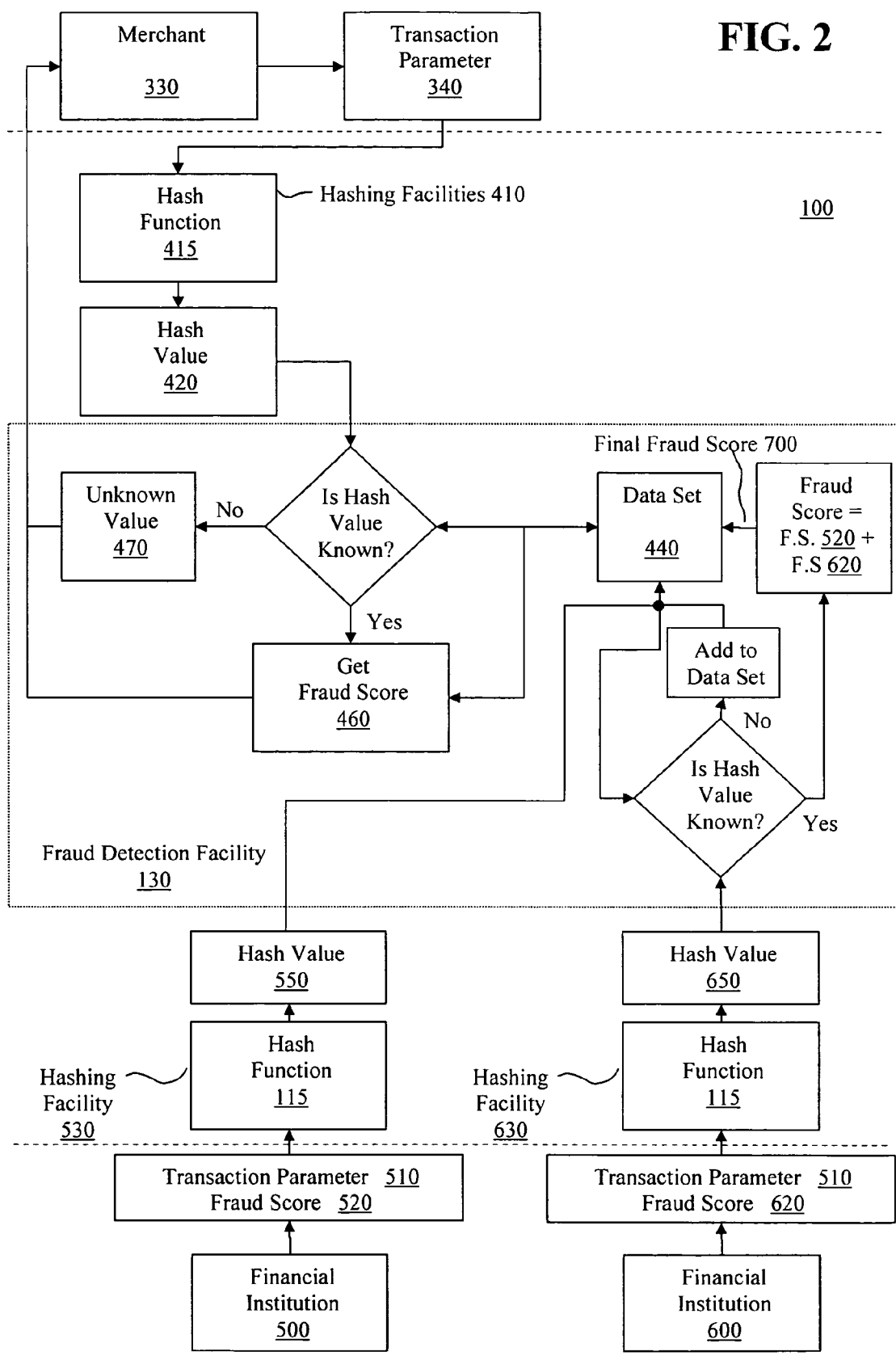
FIG. 2 is a block diagram of an exemplary commercial transaction system according to an alternate embodiment.

FIG. 2, represents an alternative embodiment of a commercial transaction system 100. According to this embodiment, a first Financial Institution 500 transmits Transaction Parameter 510, such as the name of an individual known to occasionally engage in fraudulent activity 510, along with a Fraud Score 520, to hashing facility 530. Hashing Facility 530 applies Hash Function 115 to Transaction Parameter 510, and transmits the resulting Hash Value 550, along with the Fraud Score 520, to Fraud Detection Facility 130, where the information is stored in Data Set 440. A second Financial Institution 600 is also aware that the same individual 510 may be occasionally engaging in fraudulent transactions, and so transmits Transaction Parameter 510, in this illustration, the name of that individual, along with a second Fraud Score 620, to Hashing Facility 630. Hashing Facility 630 applies Hash Function 115 to Transaction Parameter 510. Because both Financial Institutions 500 and 600 use the same Hash Function 115, the resulting Hash Value 650 is identical to Hash Value 550. Hash Value 650, along with Fraud Score 620, is transmitted to Fraud Detection Facility 130. Fraud Detection Facility 130 will compare Hash Value 650 with other hash values in Data Set 440. In the illustrated embodiment, Fraud Detection Facility 130 recognizes that Hash Value 650 is equal to Hash Value 550, which had been previously stored with Fraud Score 520 in Data Set 144. Fraud Detection Facility 130 then combines Fraud Score 620 and Fraud Score 520 and stores the resultant combination in place of, or in addition to the Fraud Score 520. In one embodiment the Fraud Detection Facility 130 mathematically combines Fraud Score 620 and Fraud Score 520, such as by adding Fraud Score 620 to Fraud Score 520 or averaging Fraud Score 620 and Fraud Score 520 to obtain Final Fraud Score 700. In an alternate embodiment, Fraud Detection Facility 520 simply stores all Fraud Scores 520, 620 associated with a particular hash value and provides all of the stored Fraud Scores upon request. It will be appreciated that Final Fraud Score 700 may be obtained using an alternative mathematical computation based on Fraud Score 520 and Fraud Score 620. Where the Fraud Scores 520, 620 are mathematically combined to generate a cumulative Final Fraud Score 700, Final Fraud Score 700 is associated with Hash Value 550, which is equal to Hash Value 650, stored in Data Set 440. If the individual 510 attempts to purchase goods or services from Merchant 330 in the manner discussed above, then Merchant 330 will be provided with the Final Fraud Score 700 associated with that individual, and will thereby be notified of the likelihood that individual 510 is engaging in fraudulent activity. In this manner, fraudulent transaction data is gathered from multiple financial institutions and used to create an overall fraud score associated with an individual. The use of one-way, collision-free hash functions allows the determination of this overall fraud score without the sharing of proprietary information among financial institutions, or between the financial institutions and the Fraud Detection Facility 130. It will be appreciated that, although the example above associates Fraud Scores 520 and 620 with the name of an individual, other transaction parameters, such as a customer address, telephone number, social security number, bank account number, drivers license number, passport number, credit card number, store account number, tax identification number, business registration number, or any other parameter or combination of parameters used to identify a customer could be associated with Fraud Scores 520 and 620.

Figure 6:
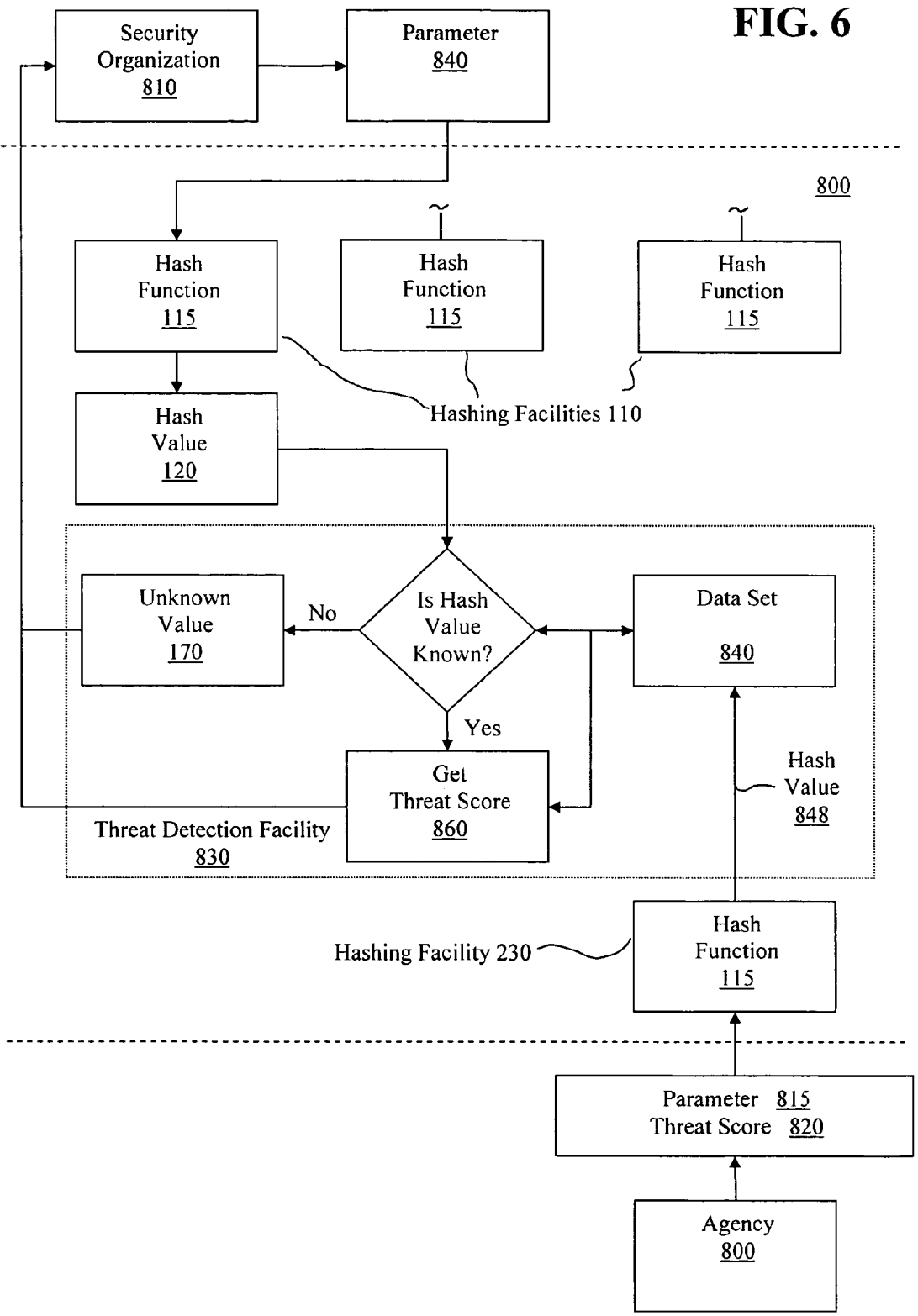
FIG. 6 is a block diagram of an exemplary threat detection system according to one embodiment.

Referring to FIG. 6, an alternative embodiment providing a threat identification system is shown at 800. The system 800 is comprised of a Hashing Facility 110 coupled with a Threat Detection Facility 830. Herein, the phrase "coupled with" is defined to mean directly connected to or indirectly connected through one or more intermediate components. Such intermediate components may include both hardware and software based components. Security organization 810 provides the Hashing Facility 110 with parameter 840. Security organization 810 may be a security organization, a police organization, or any other organization or government agency with access to Threat Detection Facility 830. As described above, parameter 840 may include one or more of an entity name, address, telephone number, social security number, bank account number, drivers license number, passport number, credit card number, store account number, tax identification number, business registration number, or any other parameter used to identify an entity. Hashing Facility 110 may be physically located at the point-of-use, or it may be located remotely, such as at security organization 810 transaction processing system, and accessed using a telephone line, a network such as the internet or a WAN or LAN, or any other electronic communication system known in the art. The Hashing Facility 110, encrypts parameter 840 using a Hash Function 115. One skilled in the art will recognize that Hash Function 115 may be any one-way collision-free hashing function, such as MD-4 or MD-5, or other similar suitable encryption algorithm. The Hash Value 120 generated by the Hash Function 115 is then transmitted to Threat Detection Facility 830. As discussed above, the Hash Function 115 is both one-way and collision-free. In other words, no other Hash Value generated by any of the one or more Hashing Facilities 130 will be identical to Hash Value 120, unless those other Hash Values were also generated using the same Hash Function 115 and the identical parameter 840.

The Hash Value 120 received by the Threat Detection Facility 830 is compared with a Data Set 840 of known Hash Values. If the Threat Detection Facility has no record of Hash Value 120, then Threat Detection Facility 830 returns a "Unknown Value" message 170, or any other similar message, to security organization 810. If the Threat Detection Facility 830 has a record of Hash Value 120, then Threat Detection Facility 830 retrieves any Threat Scores 860 associated with Hash Value 120. These Threat Scores may include a range of values indicating the likelihood of criminal or suspicious activity associated with the Hash Value 120. Criminal activities can include felony arrests or convictions, the known systematic use of violence or intimidation to achieve political objectives by an entity, or any other criminal activity known in the art. Suspicious activities may include known associations with criminal or terrorist organizations, or other activities deemed suspicious by security, police, or government agencies. For example, if the Hash Value 120 is associated with a relatively large number of criminal or suspicious activities, Threat Score 860 may be correspondingly high. Similarly, if the Hash Value 120 is associated with only a few or no criminal or suspicious activities, the Threat Score 860 may be correspondingly low. In another embodiment, the Threat Score 860 may be only one of two possible values; one value indicating that the entity is likely to be know to have engaged in criminal or suspicious activities, the other value indicating that the entity in not likely to have engaged in criminal or suspicious activities. Threat Score 860 is then transmitted to the security organization 800. Based upon the Threat Score 860, and any other information deemed relevant by security organization 810, security organization 810 may then elect to further investigate the activities of the entity.

Data used to populate the Data Set 840 used by the Threat Detection Facility 830 is provided by security, police, or government agencies 870 or any other participating entity having knowledge of criminal or suspicious activities. In one embodiment, Agency 870 provides parameter 815 and Threat Score 820 to Hashing Facility 230. Hashing Facility 230 may be located within the agency 870, or they may be remotely located and accessed using a telephone line, a network such as the internet, LAN, or WAN, or any other electronic communication system known in the art. Hashing Facility 230 applies Hash Function 115 to the parameter 815, and transmits the resulting Hash Value 848 and associated Threat Score 820 to Threat Detection Facility 830, where the information is stored in Data Set 840.

Figure 7:
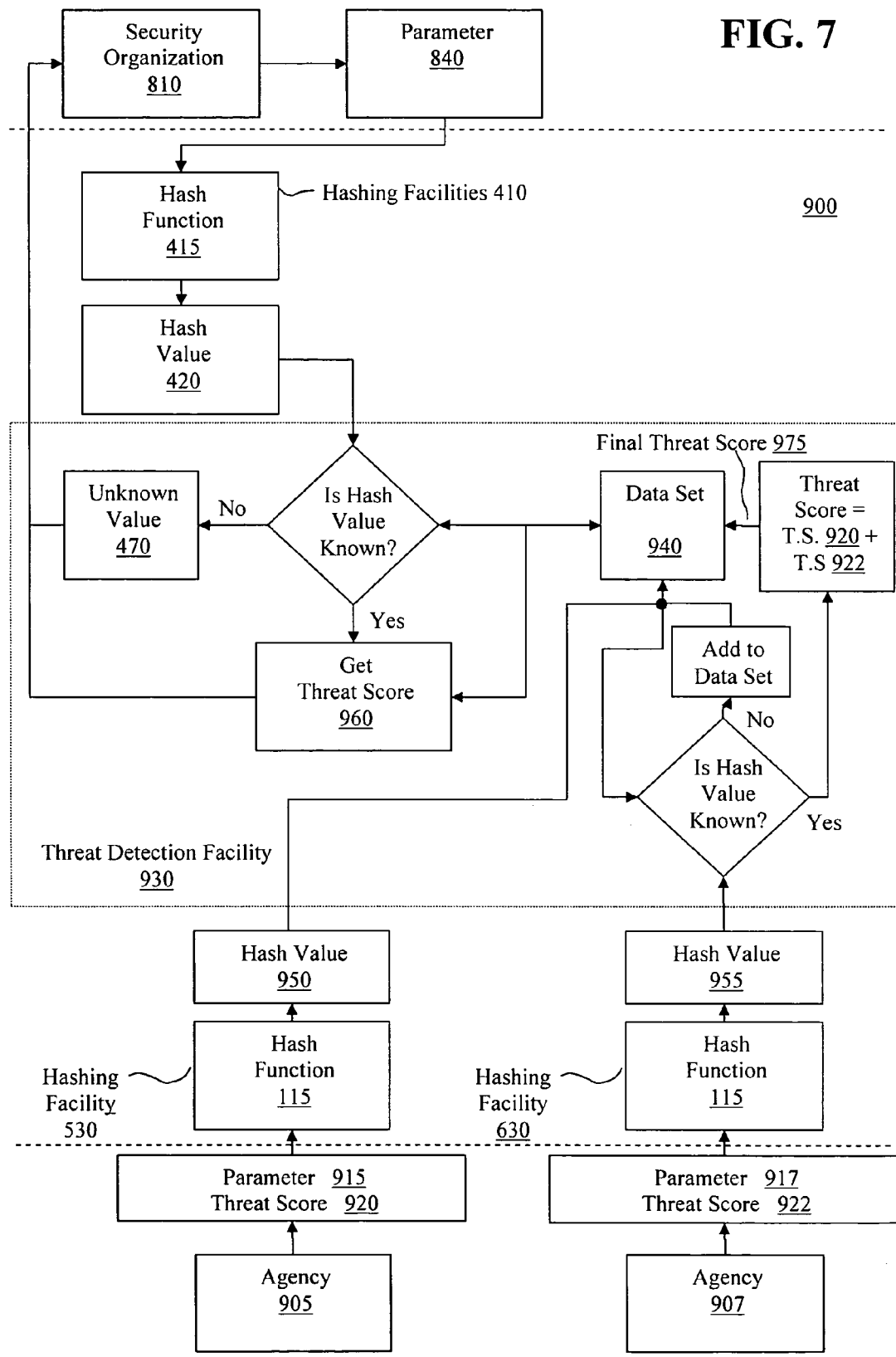
FIG. 7 is a block diagram of an exemplary threat detection system according to an alternate embodiment.

FIG. 7 represents an alternative embodiment of a threat detection system 900. According to this embodiment, a first agency 905 transmits a parameter 915 used to identify an entity known to occasionally engage in criminal or suspicious activity, along with a Threat Score 920, to Hashing Facility 530. Hashing Facility 530 applies Hash Function 115 to parameter 915, and transmits the resulting Hash Value 950, along with the Threat Score 920, to Threat Detection Facility 930, where the information is stored in Data Set 940. A second agency 907 is also aware that the same entity may be occasionally engaging in criminal or suspicious activities, and so transmits a parameter 917 identifying that entity, and equal to parameter 915 described above, along with a second Threat Score 922, to Hashing Facility 630. Hashing Facility 630 applies Hash Function 115 to parameter 917. The resulting Hash Value 955 is identical to Hash Value 950. Hash Value 955, along with Threat Score 922, is transmitted to Threat Detection Facility 930. Threat Detection Facility 930 will compare Hash Value 955 with other hash values in Data Set 940. In the illustrated embodiment, Because both Agency's 905 and 907 use the same Hash Function 115, Threat Detection Facility 930 recognizes that Hash Value 955 is equal to Hash Value 950, which had been previously stored with associated Threat Score 920 in Data Set 940. Threat Detection Facility 930 then combines Threat Score 920 and Threat Score 922 and stores the resultant combination in place of, or in addition to the Threat Score 920. In one embodiment the Threat Detection Facility 930 mathematically combines Threat Score 920 and Threat Score 922, such as by adding Threat Score 920 to Threat Score 922 or averaging Threat Score 920 and Threat Score 922 to obtain Final Threat Score 975. In an alternate embodiment, Threat Detection Facility 930 simply stores all Threat Scores 920, 922 associated with a particular hash value and provides all of the stored Threat Scores upon request by security organization 810. Where the Threat Scores 920, 922 are mathematically combined to generate a cumulative Final Threat Score 975, Final Threat Score 975 is associated with Hash Value 950, which is equal to Hash Value 955, stored in Data Set 940. According to the present embodiment, Security Organization 810 submits parameter 840 identifying an entity to Threat Detection Facility 930. As described in the earlier embodiments, parameter 840 is hashed by hashing facility 410 by applying hash function 415 to parameter 840. The resulting hash value 420 is transmitted to Threat Detection Facility 930. If hash value 420 is known to Threat Detection Facility 930, the a "Unknown Value" message 470, or similar message is sent by Threat Detection Facility 930 to security organization 810. If hash value 420 is known to Threat Detection Facility 930, the a Threat Score 960 associated with hash value 420 is retrieved from data set 940 and transmitted to security organization 810. In this manner, criminal or suspicious activity data is gathered from multiple agencies and used to create an overall threat score associated with an entity. The use of one-way, collision-free hash functions allows the determination of this overall fraud score without the sharing of proprietary information among agencies, or between agencies and the Threat Detection Facility 930.

Figure 3:
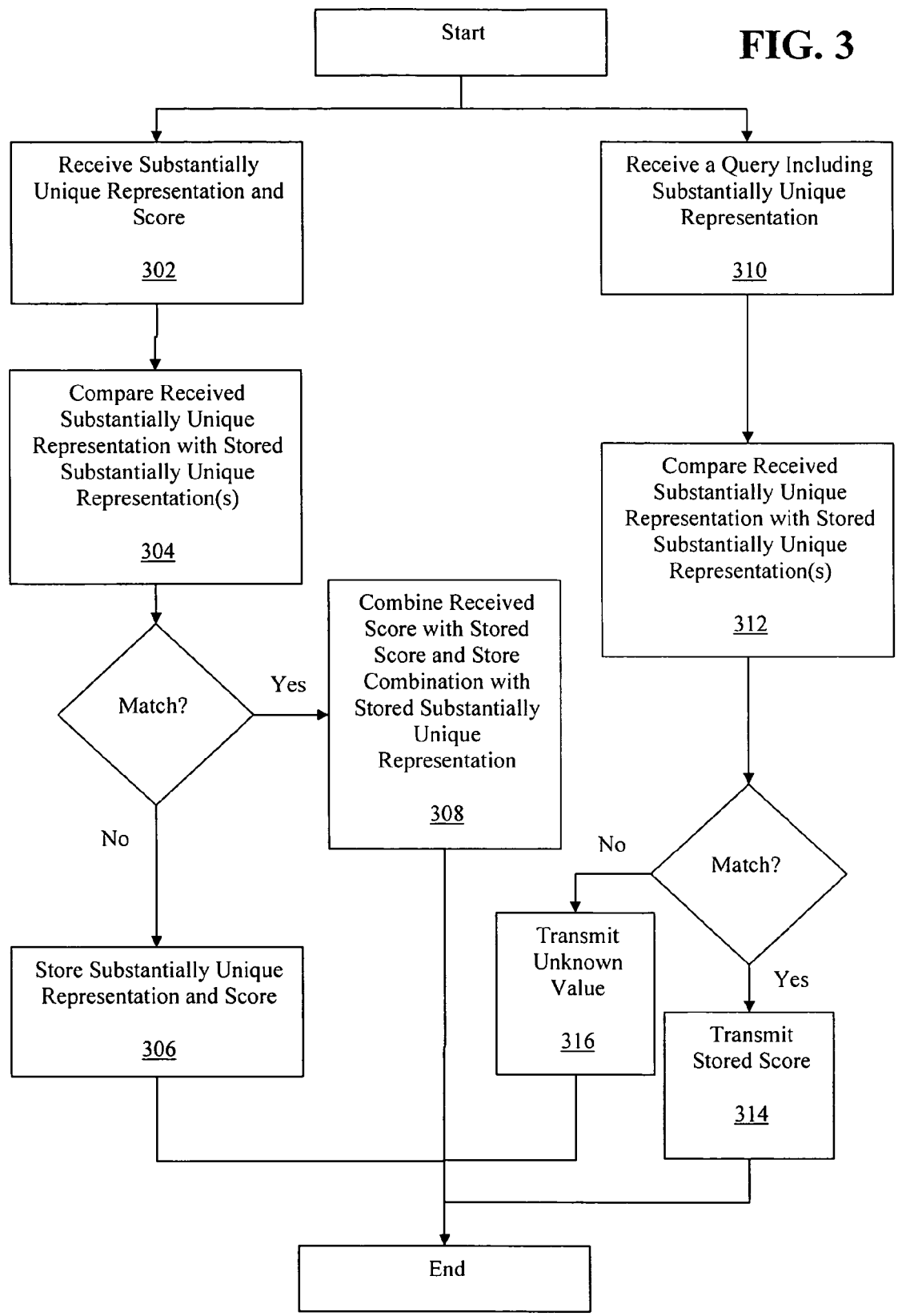
FIG. 3 depicts a flow chart showing operation of a fraud/threat detection facility according to one embodiment.

FIG. 3 shows a flow chart showing operation of a fraud or threat detection facility according one embodiment. Upon receipt of a substantially unique representation, such as a Hash Value, and an associated score, such as a fraud score or threat score (block 302), the received substantially unique representation is compared to a database of stored substantially unique representations (block 304). If there is no match, the received substantially unique representation and associated score is stored in the database for future comparisons. If there is a match, the received score value is combined, mathematically or otherwise, with the stored score associated with the matching stored database entry. The combination value is then stored in the database, in combination with or in place of the previously stored score, associated with the matching substantially unique representation (block 308). Upon receipt of a query including a substantially unique representation, such as a Hash Value (block 310), the received substantially unique representation is compared to a database of stored substantially unique representations (block 312). If there is no match, an indication that the received substantially unique representation is unknown to the facility is returned to the query originator. If there is a match, the stored score value, such as fraud score or a threat score, associated with the matching stored substantially unique representation is returned to the query originator.

Figure 4:
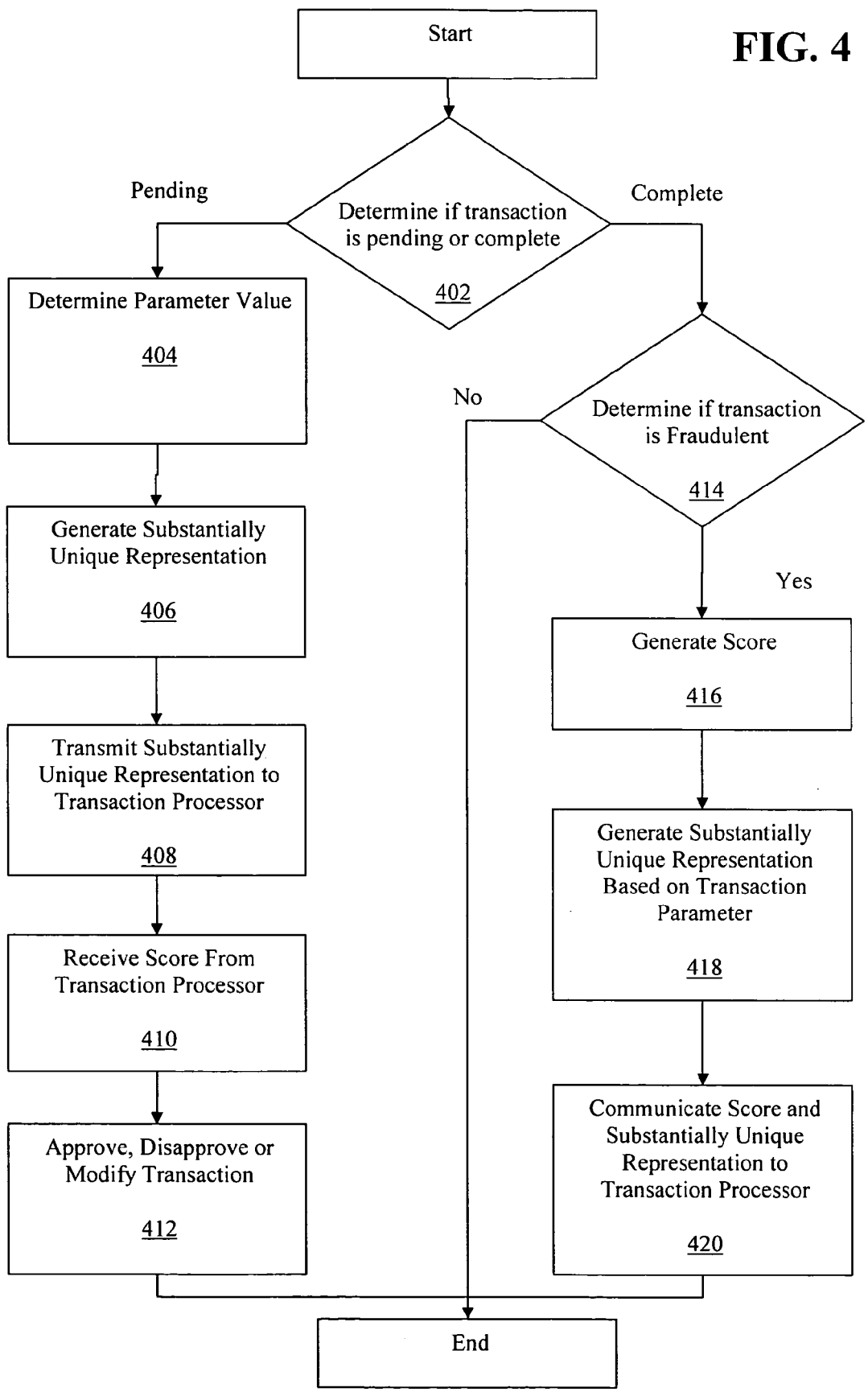
FIG. 4 depicts a flow chart showing operation of a merchant/security entity according to one embodiment.

FIG. 4 shows a flow chart showing operation of a merchant or security entity according to one embodiment. It will be appreciated that the entities which need to know about fraud or threats may be the same entities which also detect or otherwise make the determination of the existence or occurrence of fraudulent or criminal/suspicious activity. While the embodiments described herein refer to the same entity as both the user and provider of such information, it will be recognized that there may be entities which solely provide such information and other entities which solely utilize such information and that the disclosed functionality can be appropriately apportioned. In an entity that both utilizes and provides such information, whether the given transaction or activity is complete must be determined to decide whether the entity will be querying the fraud or threat detection facility or reporting to it (block 402) or both. If the transaction or activity in question is pending, a parameter of the transaction or activity is determined which identifies the party, transaction or activity and which is considered a secure value (block 404). A substantially unique representation of the parameter value is then generated, such as by processing it via a hash function as described herein (block 406). The substantially unique representation is then transmitted as part of a query to the fraud or threat detection facility (408). The response from the facility, as described above, will either comprise a score value, such as a fraud or threat score, or an indication that the substantially unique representation is unknown to the facility (block 410). The merchant or security entity then determines a course of action based on the received response (block 412). If the transaction or activity in question is complete, it is determined whether or not there has been fraudulent or otherwise criminal/threatening activity related to the transaction (block 414). If there has been no fraudulent or otherwise criminal or suspicious activity, then the process is complete for the given transaction. If there has been fraudulent or otherwise criminal activity, a score value representative of the likelihood that future transactions involving the party will be fraudulent or otherwise criminal or suspicious, or otherwise representing a threat level, is computed (block 416). A uniquely identifying secure transaction parameter is then determined and a substantially unique representation, such as a hash value, is generated based on the value of this parameter (block 418). The computed score and substantially unique representation are then communicated to the fraud or threat detection facility (block 420).

Figure 5:
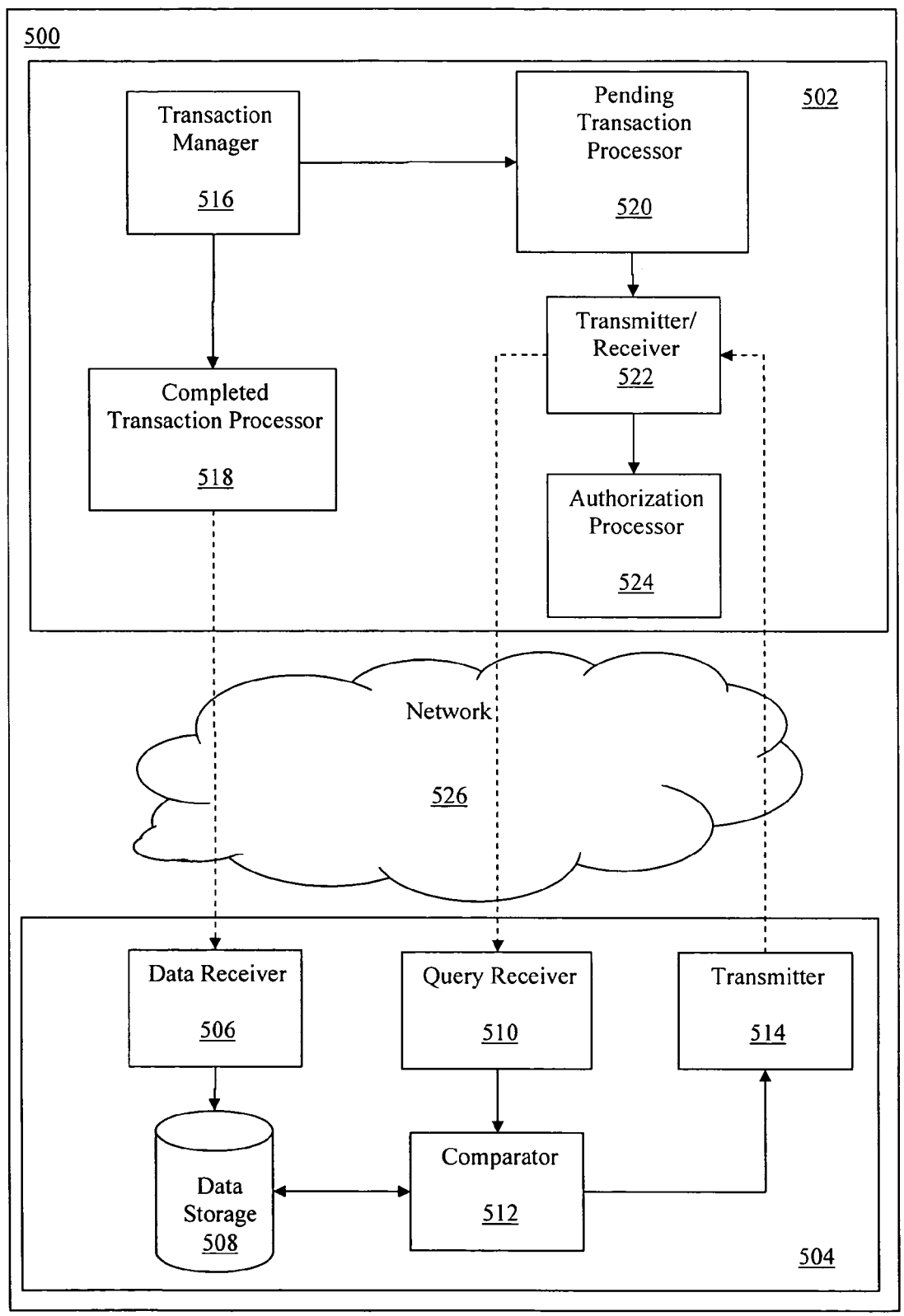
FIG. 5 depicts a block diagram of an exemplary commercial transaction/threat processing system according to an alternate embodiment.

FIG. 5 shows a block diagram of an exemplary commercial transaction or threat processing system 500 according to an alternate embodiment. The system 500 includes a merchant or security entity 502, i.e. an entity that uses and/or provides fraud or threat information, and a fraud or threat processing facility 504, i.e. an entity which stores or otherwise processes fraud or threat data and provides such data on demand. It will be appreciated that the system 500 may include one or more merchant or security entities 502 and one or more fraud or threat processing facilities 504. Further, one or more of the merchant or security entities 502 may include a fraud or threat processing facility 504. The merchant or security entity 502 is coupled with the fraud or threat processing facility 503 via a network 526. The network 526 may include any publicly accessible network, such as the Internet or the public switched telephone network, or a private network, such as an Intranet, or combinations thereof. Further, the network 526 may be wired, wireless or a combination thereof.

The merchant or security entity 502 further includes a transaction manager 516, a completed transaction processor 518, a pending transaction processor 520, a transmitter 522 and an authorization processor 524. The transaction manager 516 determines the state of the transaction and initiates processing of the transaction via the completed transaction processor 518 or the pending transaction processor 502. The completed transaction processor 518 is coupled with the transaction manager 516 and determines whether there has been fraudulent or criminal activity, computes a score based on such activity, generates the substantially unique representation and transmits this data, as part of a reporting function, to the fraud or threat processing facility 504, as described above. The pending transaction processor 520 is coupled with the transaction manager 516 and generates a substantially unique representation of a secure parameter associated with the transaction. This substantially unique representation is transmitted by the transmitter/receiver 522, which is coupled with the pending transaction processor 520, to the fraud or threat processing facility 504 via the network 526. The response generated by the fraud or threat processing facility 504 is received by the transmitter/receiver 522. The authorization processor 524 is coupled with the transmitter/receiver 522 and processes the response from the fraud or threat processing facility 504 to determine a course of action to take with respect to the pending transaction, as described herein.

The fraud or threat processing facility 504 further includes a data receiver 506, a data storage 508, a query receiver 510, a comparator 512, and a transmitter 514. The data receiver 506 receives reported fraud or threat scores and associated substantially unique representations from the completed transaction processor 518 of merchant or security entities 502. The data receiver 506 is coupled with the data storage 508 which stores reported substantially unique representations and associated score values. The data receiver 506 compares received substantially unique representations with those stored in the data storage 508 and as described above, if there is a match, mathematically or otherwise combines the received score and the associated stored score. If there is not match, the data receiver 506 stores the received substantially unique representation and associated score in the data storage 508. The query receiver 510 receives queries, including substantially unique representations, from the transmitter/receiver 522 of merchant or security entities 502. The query receiver 510 is coupled with a comparator 512 which searches the data storage 508 to see if the received substantially unique representation is already stored in the data storage 508. The comparator 512 is coupled with the transmitter 514. If the comparator 512 determines that the received substantially unique representation is not stored in the data storage 508, the transmitter 514 is instructed to communicate a message to the transmitter/receiver 522 of the requesting merchant or security entity 502 that the substantially unique representation is unknown to the fraud or threat processing facility 504. If the comparator 512 determines that the received substantially unique representation is stored in the data storage 508, the comparator 512 retrieves the associated stored score value(s) and instructs the transmitter 514 to communicate the retrieved score value(s) to the transmitter/receiver 522 of the requesting merchant or security entity 502.

It will be appreciated that the above described functionality may be implemented in hardware or software, or a combination thereof, and that any suitable computer hardware and computer programming language may be utilized to implement the described functionality. Further, one or more of the functions described may be implemented as a single functional hardware and/or software unit, or the functionality may be further apportioned among multiple hardware and/or software units, and that such details are implementation dependent.

It is therefore intended that the foregoing detailed description be regarded as illustrative rather than limiting, and that it be understood that it is the following claims, including all equivalents, that are intended to define the spirit and scope of this invention.

I claim:

1. A data manager comprising:
a computer having a processor, an interface coupled with said processor and a memory coupled with said processor and said interface;
a first logic stored in said memory and executable by said processor to receive first data via said interface from a first entity, said first data comprising a first substantially unique representation and a first score associated with said first substantially unique representation, said first substantially unique representation being representative of a first identification parameter of a first entity, said first substantially unique representation being operative to substantially obscure said first identification parameter and substantially prevent said first identification parameter from being determined from said first substantially unique representation; and
a second logic coupled with said first logic and stored in said memory and executable by said processor to store said first substantially unique representation and said first score in said memory.

2. The data manager of claim 1, further comprising:
a third logic stored in said memory and executable by said processor to receive a query via said interface from a third entity, said query comprising a second substantially unique representation of a second identification parameter, said second substantially unique representation being operative to substantially obscure said second identification parameter and to substantially prevent said second identification parameter from being determined from said second substantially unique representation, wherein said second substantially unique representation will be equivalent to said first substantially unique representation if said first identification parameter is equivalent to said second identification parameter;
a fourth logic coupled with said third logic and stored in said memory and executable by said processor to compare said second substantially unique representation with said stored first substantially unique representation; and
a fifth logic coupled with said fourth logic and stored in said memory and executable by said processor to transmit said stored first score to said third entity in response to said query if said second substantially unique representation is equivalent to said stored first substantially unique representation.

3. The data manager of claim 2, wherein said stored first score is indicative of a likelihood of fraud.

4. The data manager of claim 2, wherein said stored first score is indicative of a likelihood of suspicious activity.

5. The data manager of claim 2, wherein said first entity is different from said third entity and further wherein said first entity is substantially incapable of determining said second value and said third entity is substantially incapable of determining said first value.

6. The data manager of claim 1, wherein said first substantially unique representation comprises a hash of said first value.

7. The data manager of claim 1, wherein said first substantially unique representation comprises an encryption of said first value.

8. The data manager of claim 1, wherein said first entity comprises an entity having knowledge of suspicious activity.

9. The data manager of claim 1, wherein said first entity comprises an entity having knowledge of fraudulent activity.

10. The data manager of claim 1, wherein:
said first logic is further operative to receive second data from a third entity regarding said second entity via said interface, said second data comprising a second substantially unique representation and a second score associated with said second substantially unique representation, said second substantially unique representation being representative of a second value of said at least one parameter, said second substantially unique representation being operative to substantially obscure said second value and substantially prevent said second value from being determined from said second substantially unique representation; and further;
wherein said second logic is further operative to compare said second substantially unique representation with said stored first substantially unique representation, wherein said second substantially unique representation will be equivalent to said first substantially unique representation if said first value is equivalent to said second value; and
wherein said second logic is further operative to combine said first score and said second score and store said combination according to said first substantially unique representation in said memory if said stored first substantially unique representation is equivalent to said second substantially unique representation; and further;
wherein said second logic is further operative to store said second substantially unique representation and said second score in said memory according to said second substantially unique representation if said stored first substantially unique representation is not equivalent to said second substantially unique representation.

11. The data manager of claim 10, wherein said combination is stored in place of said first score.

12. The data manager of claim 10, wherein said combination comprises a mathematical combination of said first and second scores.

13. The data manager of claim 1, wherein said at least one parameter comprises at least one of name, billing address, home address, business address, shipping address, email address, Internet Protocol ("IP") address, telephone number, social security number, bank account number, drivers license number, passport number, and credit card number.

14. A method comprising:
receiving, by first logic stored in a memory of a computer, said computer further comprising a processor coupled with said memory and an interface coupled with said processor and said memory, said first logic being executable by said processor, first data via said interface from said first entity, said first data comprising a first substantially unique representation and a first score associated with said first substantially unique representation, said first substantially unique representation being representative of a first value of said at least one parameter, said first substantially unique representation being operative to substantially obscure said first value and substantially prevent said first value from being determined from said first substantially unique representation, said first score being indicative of a likelihood that said first value may be associated with a first fraudulent transaction; and
storing, by second logic coupled with said first logic and stored in said memory and executable by said processor, said first substantially unique representation and said first score in said memory according to said first substantially unique representation.

15. The method of claim 14, further comprising:
receiving, by third logic stored in said memory and executable by said processor, a query via said interface from said third entity, said query comprising a second substantially unique representation of a second value of said at least one parameter of said subsequent transaction, said second substantially unique representation being operative to substantially obscure said second value and to substantially prevent said second value from being determined from said second substantially unique representation, wherein said second substantially unique representation will be equivalent to said first substantially unique representation if said first value is equivalent to said second value;
comparing, by fourth logic coupled with said third logic and stored in said memory and executable by said processor, said second substantially unique representation with said stored first substantially unique representation; and
transmitting, by fifth logic coupled with said fourth logic and stored in said memory and executable by said processor, said stored first score to said third entity in response to said query if said second substantially unique representation is equivalent to said stored first substantially unique representation;
wherein said computer is unaware of said second value.

16. The method of claim 15, wherein said stored first score is indicative of a likelihood of fraud in said subsequent transaction.

17. The method of claim 15, wherein said stored first score is indicative of a likelihood of suspicious activity in said subsequent transaction.

18. The method of claim 15, wherein said first entity is different from said third entity and further wherein said first entity is substantially incapable of determining said second value and said third entity is substantially incapable of determining said first value.

19. The method of claim 14, wherein said first substantially unique representation comprises a hash of said first value.

20. The method of claim 14, wherein said first substantially unique representation comprises an encryption of said first value.

21. The method of claim 14, wherein said first entity comprises an entity having knowledge of fraudulent activity.

22. The method of claim 14, wherein:
receiving, by said first logic, second data from a third entity regarding said second entity via said interface, said second data comprising a second substantially unique representation and a second score associated with said second substantially unique representation, said second substantially unique representation being representative of a second value of said at least one parameter, said second substantially unique representation being operative to substantially obscure said second value and substantially prevent said second value from being determined from said second substantially unique representation, said second score being indicative of a likelihood that said second value may be associated with a second fraudulent transaction; and further;
comparing, by said second logic, said second substantially unique representation with said stored first substantially unique representation, wherein said second substantially unique representation will be equivalent to said first substantially unique representation if said first value is equivalent to said second value; and combining, by said second logic, said first score and said second score and storing said combination according to said first substantially unique representation in said memory if said stored first substantially unique representation is equivalent to said second substantially unique representation; and further;

storing, by said second logic, said second substantially unique representation and said second score in said memory according to said second substantially unique representation if said stored first substantially unique representation is not equivalent to said second substantially unique representation.

23. The method of claim 22, wherein said combining further comprises storing said combination in place of said first score.

24. The method of claim 22, wherein said combining further comprises mathematically combining said first and second scores.

25. The method of claim 14, wherein said at least one parameter comprises at least one of name, billing address, home address, business address, shipping address, email address, Internet Protocol ("IP") address, telephone number, social security number, bank account number, drivers license number, passport number, and credit card number.

26. A data manager for collecting information from a first entity regarding a second entity and disseminating said information to a third entity, said second entity being characterized by at least one parameter, said data manager further comprising:

a computer means having a processing means, an interface means coupled with said processing means and a memory means coupled with said processing means and said interface means;

first logic means, stored in said memory means and executable by said processing means, for receiving first data via said interface from said first entity, said first data comprising a first substantially unique representation and a first score associated with said first substantially unique representation, said first substantially unique representation being representative of a first value of said at least one parameter, said first substantially unique representation being operative to substantially obscure said first value and substantially prevent said first value from being determined from said first substantially unique representation, said first score being indicative of a likelihood that said first value may be associated with a first fraudulent transaction; and second logic means coupled with said first logic means and stored in said memory means and executable by said processing means, for storing said first substantially unique representation and said first score in said memory according to said first substantially unique representation;

wherein said data manager is unaware of said first value.

27. The data manager of claim 26, further comprising:

third logic means stored in said memory means and executable by said processing means, for receiving a query via said interface from said third entity, said query comprising a second substantially unique representation of a second value of said at least one parameter of said subsequent transaction, said second substantially unique representation being operative to substantially obscure said second value and to substantially prevent said second value from being determined from said second substantially unique representation, wherein said second substantially unique representation will be equivalent to said first substantially unique representation if said first value is equivalent to said second value;

fourth logic means coupled with said third logic means and stored in said memory means and executable by said processing means, for comparing said second substantially unique representation with said stored first substantially unique representation; and fifth logic means coupled with said fourth logic means and stored in said memory means and executable by said processing means, for transmitting said stored first score to said third entity in response to said query if said second substantially unique representation is equivalent to said stored first substantially unique representation;

wherein said data manager is unaware of said second value.

28. The data manager of claim 27, wherein said stored first score is indicative of a likelihood of fraud in said subsequent transaction.

29. The data manager of claim 27, wherein said stored first score is indicative of a likelihood of suspicious activity in said subsequent transaction.

30. The data manager of claim 26, wherein said first substantially unique representation comprises a hash of said first value.

31. The data manager of claim 26, wherein said first substantially unique representation comprises an encryption of said first value.

32. The data manager of claim 26, wherein:

said first logic means is farther operative to receive second data from a third entity regarding said second entity via said interface, said second data comprising a second substantially unique representation and a second score associated with said second substantially unique representation, said second substantially unique representation being representative of a second value of said at least one parameter, said second substantially unique representation being operative to substantially obscure said second value and substantially prevent said second value from being determined from said second substantially unique representation, said second score being indicative of a likelihood that said second value may be associated with a second fraudulent transaction; and further;

wherein said second logic means is further operative to compare said second substantially unique representation with said stored first substantially unique representation, wherein said second substantially unique representation will be equivalent to said first substantially unique representation if said first value is equivalent to said second value; and wherein said second logic means is further operative to combine said first score and said second score and store said combination according to said first substantially unique representation in said memory if said stored first substantially unique representation is equivalent to said second substantially unique representation; and further;

wherein said second logic means is further operative to store said second substantially unique representation and said second score in said memory according to said second substantially unique representation if said stored first substantially unique representation is not equivalent to said second substantially unique representation.

33. The data manager of claim 32, wherein said combination is stored in place of said first score.

34. The data manager of claim 32, wherein said combination comprises a mathematical combination of said first and second scores.

35. A system for collecting information from a first entity regarding a second entity and disseminating said information to a third entity, said second entity being characterized by at least one parameter, said system comprising:
a data receiver operative to receive first data from said first entity, said first data comprising a first substantially unique representation and a first score associated with said first substantially unique representation, said first substantially unique representation being representative of a first value of said at least one parameter, said first substantially unique representation being operative to substantially obscure said first value and substantially prevent said first value from being determined from said first substantially unique representation;
a data storage coupled with said data receiver and operative to store said first substantially unique representation and said first score according to said first substantially unique representation;
wherein said system is unaware of said first value.

36. The system of claim 35, further comprising:
a query receiver operative to receive a query via said interface from said third entity, said query comprising a second substantially unique representation of a second value of said at least one parameter of said subsequent transaction, said second substantially unique representation being operative to substantially obscure said second value and to substantially prevent said second value from being determined from said second substantially unique representation, wherein said second substantially unique representation will be equivalent to said first substantially unique representation if said first value is equivalent to said second value;
a comparator coupled with said query receiver and operative to compare said second substantially unique representation with said stored first substantially unique representation; and
a score transmitter coupled with said comparator and operative to transmit said stored first score to said third entity in response to said query if said second substantially unique representation is equivalent to said stored first substantially unique representation;
wherein said system is unaware of said second value.

37. A method of collecting information by a collecting entity from a first entity regarding a second entity and disseminating said information to a third entity, said second entity being characterized by at least one parameter, said method comprising:
receiving first data from said first entity, said first data comprising a first substantially unique representation and a first score associated with said first substantially unique representation, said first substantially unique representation being representative of a first value of said at least one parameter, said first substantially unique representation being operative to substantially obscure said first value and substantially prevent said first value from being determined from said first substantially unique representation, said first score being indicative of a likelihood that said first value may be associated with a first fraudulent transaction;
storing said first substantially unique representation and said first score according to said first substantially unique representation;
wherein said collecting entity is unaware of said first value.

38. The method of claim 37, further comprising:
receiving a query via said interface from said third entity, said query comprising a second substantially unique representation of a second value of said at least one parameter of said subsequent transaction, said second substantially unique representation being operative to substantially obscure said second value and to substantially prevent said second value from being determined from said second substantially unique representation, wherein said second substantially unique representation will be equivalent to said first substantially unique representation if said first value is equivalent to said second value;
comparing said second substantially unique representation with said stored first substantially unique representation; and
transmitting said stored first score to said third entity in response to said query if said second substantially unique representation is equivalent to said stored first substantially unique representation;
wherein said collecting entity is unaware of said second value.

39. The method of claim 38, wherein said stored first score is indicative of a likelihood of fraud in said subsequent transaction.

40. The method of claim 38, wherein said stored first score is indicative of a likelihood of suspicious activity in said subsequent transaction.

41. A system for collecting information from a first entity regarding a second entity and disseminating said information to a third entity regarding a subsequent transaction between said second entity and said third entity, said second entity being characterized by at least one parameter, said system comprising:
data receiving means for receiving first data from said first entity, said first data comprising a first substantially unique representation and a first score associated with said first substantially unique representation, said first substantially unique representation being representative of a first value of said at least one parameter, said first substantially unique representation being operative to substantially obscure said first value and substantially prevent said first value from being determined from said first substantially unique representation, said first score being indicative of a likelihood that said first value may be associated with a first fraudulent transaction;
data storage means, coupled with said data receiving means, for storing said first substantially unique representation and said first score according to said first substantially unique representation;
wherein said system is unaware of said first value.

42. The system of claim 41, further comprising:
query receiving means for receiving a query via said interface from said third entity, said query comprising a second substantially unique representation of a second value of said at least one parameter of said subsequent transaction, said second substantially unique representation being operative to substantially obscure said second value and to substantially prevent said second value from being determined from said second substantially unique representation, wherein said second substantially unique representation will be equivalent to said first substantially unique representation if said first value is equivalent to said second value;

comparator means, coupled with said query receiver, for comparing said second substantially unique representation with said stored first substantially unique representation; and score transmitter means, coupled with said comparator, for transmitting said stored first score to said third entity in response to said query if said second substantially unique representation is equivalent to said stored first substantially unique representation;

wherein said system is unaware of said second value.

43. A transaction manager for communicating information regarding a first entity, said information being further related to a first transaction involving said first entity, said first entity being characterized by at least one parameter, said system comprising:

a computer having a processor, an interface coupled with said processor and a memory coupled with said interface and said processor;

first logic stored in said memory and executable by said processor, said first logic being operative to determine whether said first transaction is one of pending and complete;

second logic, coupled with said first logic, stored in said memory and executable by said processor, and operative, if said first transaction is pending, to determine a value of said at least one parameter and generate a first substantially unique representation of said value, said first substantially unique representation being operative to substantially obscure said value and substantially prevent said value from being determined from said first substantially unique representation;

third logic, coupled with said second logic, stored in said memory and executable by said processor, and operative to transmit said first substantially unique representation via said interface to a transaction processor and receive a subsequent response therefrom; and fourth logic, coupled with said first logic, stored in said memory and executable by said processor, and operative, if said first transaction is complete, to determine whether said first transaction is fraudulent, said fourth logic being further operative, if said first transaction is determined to be fraudulent, to compute a second score, based on said first transaction, indicative of the likelihood that a subsequent transaction with said first entity will be fraudulent and to further determine a value of said at least one parameter and generate a second substantially unique representation of said value, said second substantially unique representation being operative to substantially obscure said value and substantially prevent said value from being determined from said second substantially unique representation, wherein said fourth logic is further operative to communicate said second score and said second substantially unique representation to said transaction processor via said interface.

44. The transaction manager of claim 43, further comprising:

fifth logic, coupled with said third logic, stored in said memory and executable by said processor, and operative to one of approve, disapprove and modify said first transaction based on said first score.

45. The transaction manager of claim 43, wherein said second and fourth logic further comprise a hash function operative to generate said first and second substantially unique representations as hashes of said first and second values, respectively.

46. A method implemented in a computer for communicating information regarding a first entity, said information being further related to a first transaction involving said first entity, said first entity being characterized by at least one parameter, said method comprising:

determining, by first logic stored in a memory of a computer, said computer further comprising a processor coupled with said memory and an interface coupled with said processor and said memory, said first logic being executable by said processor, whether said first transaction is one of pending and complete;

determining, by second logic, coupled with said first logic, stored in said memory and executable by said processor, if said first transaction is pending, a value of said at least one parameter and generating a first substantially unique representation of said value, said first substantially unique representation being operative to substantially obscure said value and substantially prevent said value from being determined from said first substantially unique representation;

transmitting, by third logic, coupled with said second logic, stored in said memory and executable by said processor, said first substantially unique representation via said interface to a transaction processor and receiving a subsequent response therefrom; and determining, by fourth logic, coupled with said first logic, stored in said memory and executable by said processor, if said first transaction is complete, whether said first transaction is fraudulent, and, if said first transaction is determined to be fraudulent, computing a second score, based on said first transaction, indicative of the likelihood that a subsequent transaction with said first entity will be fraudulent, determining a value of said at least one parameter and generating a second substantially unique representation of said value, said second substantially unique representation being operative to substantially obscure said value and substantially prevent said value from being determined from said second substantially unique representation, and communicating said second score and said second substantially unique representation to said transaction processor via said interface.

47. A method for communicating non-secure data between a first entity and a second entity, said first and second entities each having access to secure data, said method comprising:

acquiring said non-secure data, said non-secure data requiring said secure data to contextualize said non-secure data;

generating a substantially unique representation of said secure data, said substantially unique representation being operative to substantially obscure said secure data and substantially prevent said secure data from being determined from said substantially unique representation; and transmitting said non-secure data and said substantially unique representation to said second entity.

48. A method for communicating non-secure data between a first entity and a second entity, said first entity having access to first secure data and said second entity having access to second secure data, said method comprising:

receiving said non-secure data from said first entity, said non-secure data requiring said secure data to contextualize said non-secure data;

receiving a first substantially unique representation of said first secure data from said first entity, said first substantially unique representation being operative to substantially obscure said first secure data and substantially prevent said first secure data from being determined from said first substantially unique representation;

generating a second substantially unique representation of said second secure data, said second substantially unique representation being operative to substantially obscure said second secure data and substantially prevent said second secure data from being determined from said second substantially unique representation;

comparing said first and second substantially unique representations;

using said second secure data, where said first substantially unique representation is equivalent to said second substantially unique representation, to contextualize said non-secure data.

* * * * *

UNITED STATES PATENT AND TRADEMARK OFFICE
CERTIFICATE OF CORRECTION

| | | |
|---|---|---|
| PATENT NO. | : 7,346,927 B2 | Page 1 of 1 |
| APPLICATION NO. | : 10/734877 | |
| DATED | : March 18, 2008 | |
| INVENTOR(S) | : James M. Hillmer | |

It is certified that error appears in the above-identified patent and that said Letters Patent is hereby corrected as shown below:

<u>In the Claims</u>

Column 16, in claim 32, line 2, before "operative to receive" delete "farther" and substitute --further-- in its place.

Signed and Sealed this

Second Day of September, 2008

JON W. DUDAS
*Director of the United States Patent and Trademark Office*